(12) United States Patent
Simula et al.

(10) Patent No.: US 8,764,129 B2
(45) Date of Patent: Jul. 1, 2014

(54) TRACK OVER TIRE SYSTEM AND METHOD

(75) Inventors: Glen Raymond Simula, Hancock, MI (US); Steven John Tarnowski, Calumet, MI (US)

(73) Assignee: GSE Technologies, LLC, Houghton, MI (US)

( * ) Notice: Subject to any disclaimer, the term of this patent is extended or adjusted under 35 U.S.C. 154(b) by 366 days.

(21) Appl. No.: 13/117,201

(22) Filed: May 27, 2011

(65) Prior Publication Data

US 2012/0299371 A1 Nov. 29, 2012

(51) Int. Cl.
*B62D 55/084* (2006.01)

(52) U.S. Cl.
USPC .......................................... 305/124

(58) Field of Classification Search
USPC ........... 305/15, 124, 125, 128, 130, 139, 141, 305/143, 144, 158, 165, 185
See application file for complete search history.

(56) References Cited

U.S. PATENT DOCUMENTS

| | | | |
|---|---|---|---|
| 1,660,100 A | 2/1928 | Smyth | |
| 2,059,213 A | 11/1936 | Dorst | |
| 3,232,679 A * | 2/1966 | Katzenberger | 305/113 |
| 3,724,580 A * | 4/1973 | Adams, Jr. | 180/9.21 |
| 4,810,043 A | 3/1989 | McIntosh | |
| 4,826,260 A * | 5/1989 | Plourde | 305/120 |
| 5,316,381 A * | 5/1994 | Isaacson et al. | 305/145 |
| 5,409,075 A * | 4/1995 | Nieman | 180/9.5 |
| 5,607,210 A * | 3/1997 | Brazier | 305/131 |
| 5,851,058 A | 12/1998 | Humbek et al. | |
| 6,234,590 B1 * | 5/2001 | Satzler | 305/132 |
| 6,296,328 B1 | 10/2001 | Wilkinson | |
| 6,860,571 B2 * | 3/2005 | Scheetz | 305/143 |
| 7,083,241 B2 | 8/2006 | Gunter | |
| 7,131,508 B2 * | 11/2006 | Brazier | 180/9.21 |
| 7,497,530 B2 * | 3/2009 | Bessette | 305/135 |
| 7,914,087 B2 * | 3/2011 | Alfthan | 305/145 |
| 8,414,091 B2 * | 4/2013 | Pech et al. | 305/139 |

* cited by examiner

*Primary Examiner* — S. Joseph Morano
*Assistant Examiner* — Jean Charleston
(74) *Attorney, Agent, or Firm* — Brooks Kushman P.C.

(57) ABSTRACT

A system and method of increasing the traction and mobility of a tandem axled vehicle by disposing an endless track 16 around the vehicle tires 18,20 and using a tensioning device 22 to impart a force on the endless track 16 to maintain an optimal track tension. The tensioning device 22 may impart a constant force, a force within a set range, or a variable force controlled by a processor 64 on the endless track 16. The processor 64 monitors vehicle parameters to determine if endless track slipping is occurring. The slip-control processor 64 sends signals to the tension device 22 to increase endless track tension when a track slip condition is sensed, and sends signals to decrease endless track tension when slipping is not occurring, thereby allowing for greater suspension movement and improving overall vehicle mobility.

11 Claims, 7 Drawing Sheets

US 8,764,129 B2

TRACK OVER TIRE SYSTEM AND METHOD

The invention was made in part with Government support. The Government may have certain rights to the invention.

TECHNICAL FIELD

Embodiments of the present invention relate to track over tire systems and methods on vehicles with multiple axle sets connected to the vehicle through a vehicle suspension system.

BACKGROUND

Endless tracks have been used on vehicles to increase the surface area on the ground upon which the vehicle traverses. This increased vehicle footprint results in a lower force per unit area on the ground being traversed than a conventional wheeled vehicle of the same weight.

Most tracked vehicles utilize an endless track driven by a sprocket in which teeth of the sprocket engage links of the track to drive the track and the vehicle forward. Road wheels are attached to the vehicle through independent suspensions and roll over the track as the vehicle traverses the ground. In this design, the road wheels do not drive the vehicle forward, only the sprocket is used for movement. The direct engagement of the sprocket does not allow for track slippage relative to the sprocket.

Track over tire systems have been used on vehicles used in agriculture, construction equipment, and off-highway systems in the past. These systems utilize an endless track disposed around the existing tires of the vehicle. The tires drive the vehicle forward by driving over the track. However, these systems experienced tires slipping relative to the tracks and greatly restrict, or completely lock, the suspension movement.

The following references were considered before filing this application: U.S. Pat. No. 6,296,328 to Wilkinson, U.S. Pat. No. 4,810,043 to McIntosh, U.S. Pat. No. 2,059,213 to Dorst, U.S. Pat. No. 1,660,100 to Smyth, U.S. Pat. No. 7,083,241 to Gunter, and U.S. Pat. No. 5,851,058 to Humbek et al.

SUMMARY

One embodiment of the present invention is to provide a method of increasing vehicle traction and mobility on a multiple axled vehicle. A multiple axled vehicle has two or more axles which are in series and close proximity to one another. The axles have wheels and tires, and are connected to the vehicle through a suspension. An endless track is disposed around the tires of the multiple axle set and increases the vehicle's footprint. In this embodiment, a tensioning device is attached to the vehicle so as to impart a force on the endless track to maintain an optimal track tension, decreasing endless track slippage relative to the tires, allowing for optimum suspension travel, and in combination with the increased vehicle footprint, increasing the overall vehicle traction and mobility of the vehicle.

In another embodiment of the present invention, the tensioning device exerts a variable force on the endless track in order to increase, decrease, or maintain endless track tension as needed. When the variable force is increased, the endless track will achieve a greater tension around the tires and decrease track slippage relative to the tires. When the variable force is decreased, the endless track will achieve a lower tension around the tires and allow for greater suspension travel. Decreasing track tension, especially when increased track tension is not needed, also increases fuel economy and reduces wear of the mating components.

In one version of the variable tensioning device embodiment, the tensioning device is designed to maintain an endless track tension within an optimum range. As the suspension moves creating greater distance between the wheels of the axle, the tensioning device lowers the force applied to maintain a substantially constant tension around the tires. As the suspension moves bringing the tires closer together, the tensioning device applies a greater force to take up the resulting slack and thus still maintaining a substantially constant track tension. This version of the variable tensioning device uses mechanical devices such as a constant pressure source from the vehicle pneumatic system and pressure relief valves.

In another version of the variable tensioning device embodiment, the system utilizes a slip-control processor to control the tensioning device. In this version, the tension of the endless track may be varied depending on the vehicle parameters. The processor monitors the vehicle parameters utilizing a control loop algorithm to determine if endless track slipping is occurring or whether the vehicle may allow for greater suspension travel. In this version, the slip-control processor sends signals to the tension device to increase or decrease endless track tension as needed during operation to improve overall vehicle mobility.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

Figure 1:
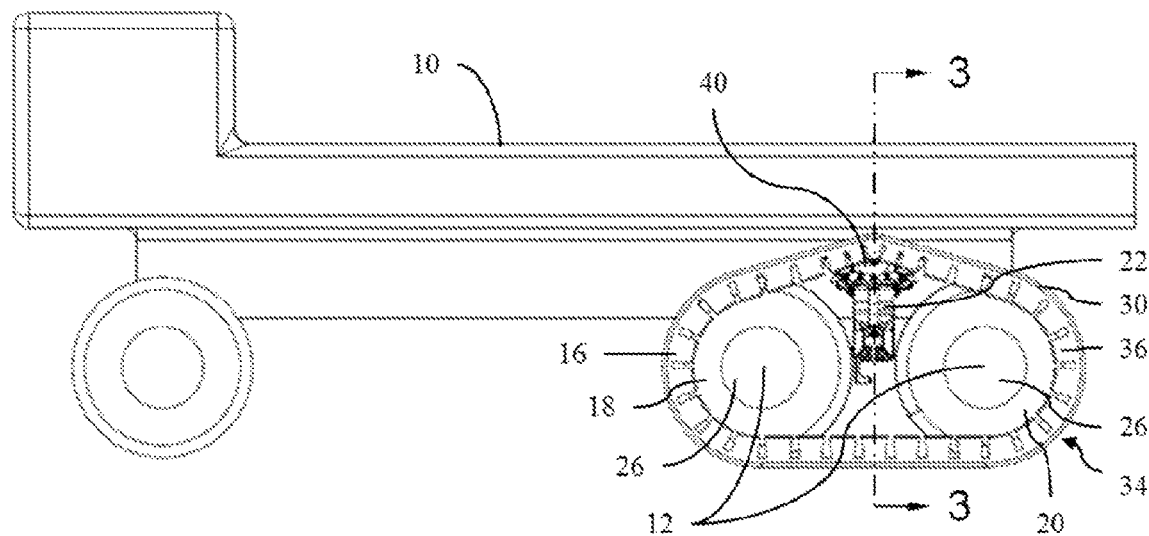
FIG. 1 is a side view of a multiple axle set vehicle with an endless track around the front and rear tires of the multiple axle set.
Figure 2:
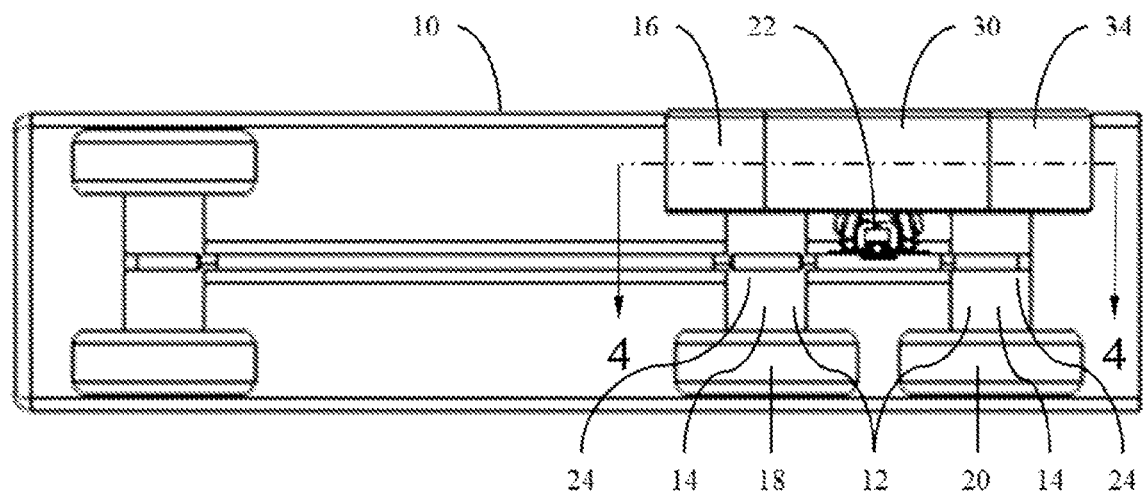
FIG. 2 is a bottom view of a multiple axle set vehicle with an endless track around the left side front and rear tires of the multiple axle set.
Figure 3:
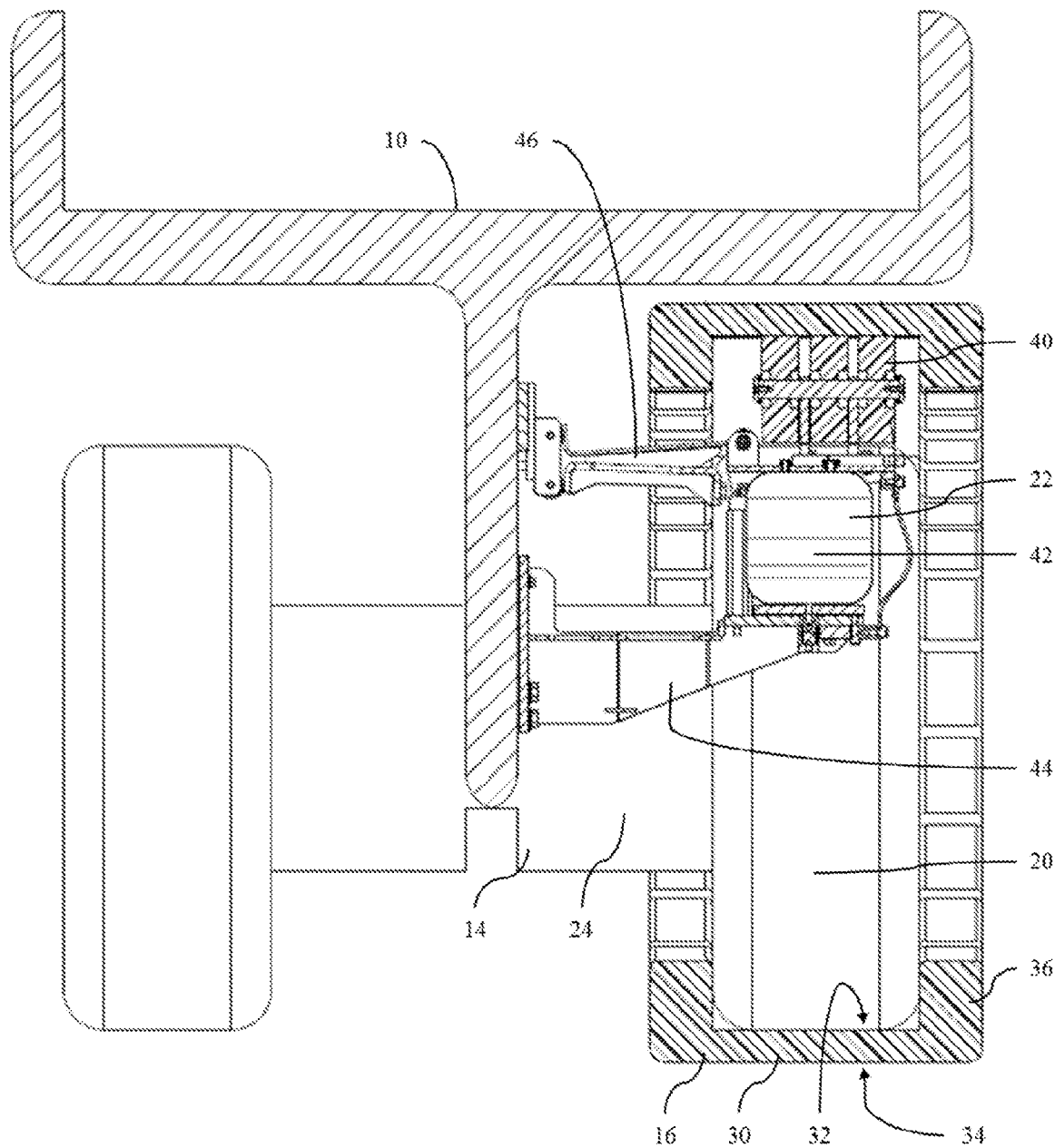
FIG. 3 is a cross-sectional view taken along line 3-3 in FIG. 1.

In regards to FIG. 1, an embodiment of a vehicle 10 (illustrated as a generic representative vehicle model) is shown with a multiple axle set 12 connected to the vehicle 10 through a suspension 14 (axles and suspension illustrated as a generic representative axle/suspension model, best seen in FIGS. 2 and 3). In this embodiment an endless track 16 is shown partially disposed around a front tire 18 and a rear tire 20 of the axle set 12. The endless track 16 is tensioned around the front tire 18 and rear tire 20 by a tensioning device 22.

Vehicle 10 may be any vehicle that has multiple axles grouped in axle sets, also known as tandem axles, which are connected to a vehicle through a suspension. A tandem axle set is two or more axles in series and grouped close together. Vehicle 10 is designed such that it typically does not require an endless track for operation. Examples of vehicles that fit this description are trucks with tandem axles from the Family of Medium Tactical Vehicles (FMTV), Medium Tactical Vehicle Replacement (MTVR) trucks, United States Army M35 family of trucks, United States Army M939 family of trucks, 6×4 and 6×6 versions of the Navistar 7000 series of trucks, and Heavy Expanded Mobility Tactical Trucks (HEMTT). This list is given to better understand the usage of the invention and should not be viewed as limiting, as the invention may be used with any vehicle with a multiple axle set.

As shown in the embodiment in FIG. 1, Vehicle 10 typically has an axle set 12 with two driven axles 24 having wheels 26 and tires 18,20 on the ends of each of the axles 24. The term axle 24 may refer to the shaft itself, its housing, half-shaft, or a transverse pair of wheels. The axle shaft, or half-shaft, typically rotates with the wheel 26 being either bolted or splined in fixed relation (not shown) to the axle shaft. The housing around the axle shaft is also commonly referred to simply as an axle as well, usually encompassing the housing and shaft combination. An even broader sense of the word refers to every transverse pair of wheels on a vehicle, whether they are connected to each other or not, thus even transverse pairs of wheels in a vehicle with an independent suspension are also included in the term axle or axle set as used herein.

The suspension 14 is traditionally a system of springs, shock absorbers and linkages that connect the vehicle 10 to its wheels 26 through the axle 24. Common forms of suspensions include leaf spring suspensions, torsion beam suspensions, coil spring suspensions, and air suspensions, although any form of suspension may be used with this invention.

FIG. 1 shows the endless track 16 partially disposed around the front tire 18 and the rear tire 20 associated with the multiple axle set 12. In this embodiment, the endless track 16 is shown with a main track body 30 having an inner surface 32 (best seen in FIG. 3) and an outer surface 34 opposite the inner surface. Portions of the inner surface 32 of the endless track 16 contact portions of the front tire 18 and portions of the rear tire 20. Portions of the outer surface 34 of the endless track 16 are designed to contact the ground.

In this embodiment, the endless track 16 also has a plurality of edge guide projections 36 connected to the main track body 30 and extending away from the inner surface 32. As seen in FIG. 1, some of the edge guide projections 36 are designed to contact portions of the front and rear tires 18,20. The edge guide projections 36 are designed to allow the endless track 16 to track around the tires 18,20 during use. It should be noted that other guide designs may be used, such as center guide projections used with dual wheel and tire sets that project between the opposing tire faces of the dual wheel/tire set.

FIG. 1 also shows an embodiment in which the tensioning device 22 is disposed between the front and rear tires 18,20 of the axle set 12. The tensioning device 22 uses an idler wheel 40 in contact with the inner surface 32 of the endless track 16 to maintain track tension on the endless track 16 around the tires 18, 20.

FIG. 2 is a bottom view of the embodiment as shown in FIG. 1. FIG. 2 shows an endless track 16 disposed around the vehicle's left side front and rear tires of the multiple axle set 12. As well, this figure only shows a tensioning device 22 installed on the left side of the vehicle. The vehicle's right side front and rear tires 18, do not have an endless track disposed around them, nor is there a tensioning device installed on the right side of the vehicle in this figure. In practice, a vehicle would likely be symmetrically fitted with a track over tire system on both the left and the right side of the vehicle, although the vehicle could continue to operate even if only one side had a track installed.

FIG. 3 is a cross-sectional view taken along line 3-3 of the embodiment in FIG. 1. FIG. 3, like FIG. 2, only has an endless track 16 partially disposed around the vehicle's left side front and rear tires 20 of the axle set 12. The cross-sectional view shown here looks to the rear of the vehicle and shows the endless track 16 partially disposed around the rear tire 20. FIG. 3 also shows an embodiment in which the tensioning device 22 has an actuator 42 disposed between a base 44 and the idler wheel 40. The base 44 is shown attached to the vehicle 10. In some embodiments, the tensioning device 22 may also be attached to the vehicle 10 by an upper articulating arm 46.

The actuator 42 may actuate away from the base 44 applying a force to the inner surface 32 of the endless track 16 through the idler wheel 40. The tensioning device 22 places a load on the endless track 16 thereby producing a track tension around the front and rear tires 18,20. As the track tension is increased, so is the friction between the tires 18,20 and the inner surface 32 of the endless track 16. The increased friction reduces slippage between the endless track 16 and the front and rear tires 18,20, and the endless track 16 and the tensioning device 22 cooperate to increase vehicle traction and allow for axle suspension movement.

In one embodiment, the actuator 42 actuates providing a varying force through the idler wheel 40 to the endless track to maintaining a substantially constant endless track tension around the front and rear tires 18,20. The tensioning device 22 uses mechanical means to vary the force applied to the endless track 16 to maintain a substantially constant endless track tension while allowing variable distances between the front tire and the rear tire caused by axle suspension 14 movement. When the vehicle 10 is traveling over level ground, the distance between the center point of the front tire 18 and the center point of the rear tire 20 is relatively constant. As the vehicle 10 begins traveling over uneven ground, the suspension 14 allows for the front and rear tires 18,20 to rise and fall with the terrain. As the front and rear tires 18,20 rise and fall with the terrain, the distance between the center points of the tires 18,20 change. As the distance between the front and rear tires 18,20 change, so too does the tension on the endless track 16 disposed around the tires 18,20. To accommodate for the change in distances, and to maintain a substantially constant track tension, the tensioning device 22 will take up the slack achieved when the tires come closer.

In one embodiment, the tensioning device 22 maintains a nearly constant 4000 pound force on the endless track 16, regardless of suspension travel. In another embodiment, the tensioning device 22 applies a force the endless track 16 between 3600 pounds and 4400 pounds. As the suspension 14 allows the tires to move further apart, thus tightening the endless track 16, the tensioning device 22 does not allow the tension to exceed the 4400 pound threshold. This may be accomplished by dumping pressure in the actuator 42. As the suspension 14 allows the tires to move closer together, giving more slack to the endless track 16, the tensioning device 22 does not allow the tension to fall beneath 3600 pounds. This may be done by increasing pressure in the actuator 46. By maintaining a nearly constant force on the track, the endless track 16 maintains a nearly constant tension, thus translating into a nearly constant friction between the tires 18,20 and the inner surface 32 of the endless track 16. This system maintains superior vehicle traction while allowing varying distance changes between the front tire 18 and the rear tire 20 caused by axle suspension 14 movement.

It should be noted that the endless track 16 may be made of any number of materials, such as, but not limited to, rubber, steel or composite materials. The endless track 16 may also be a single piece with one joint connecting the two ends together around the tires, or may be an endless track 16 made up of a plurality of smaller track shoe assemblies in which there is a joint in the endless track between each shoe. Due to the variation in materials, number of joints, and overall length of the endless track, along with the size and type of the tire the endless track is used in combination with, the endless tracks used with this system will experience a different level of stretchability and thus react differently to the amount of force imparted on it by the tensioning device. Testing is conducted to optimize the kind of endless track to be used with the kind of vehicle and the amount of force to be imparted on to the endless track to increase overall vehicle mobility. Thus the 3600 to 4400 pound range from the previous paragraph was optimized on a FMTV with a single piece rubber Camoplast endless track, and this force range should not be considered limiting, as the force range would change for differing vehicles and endless tracks.

Figure 4:
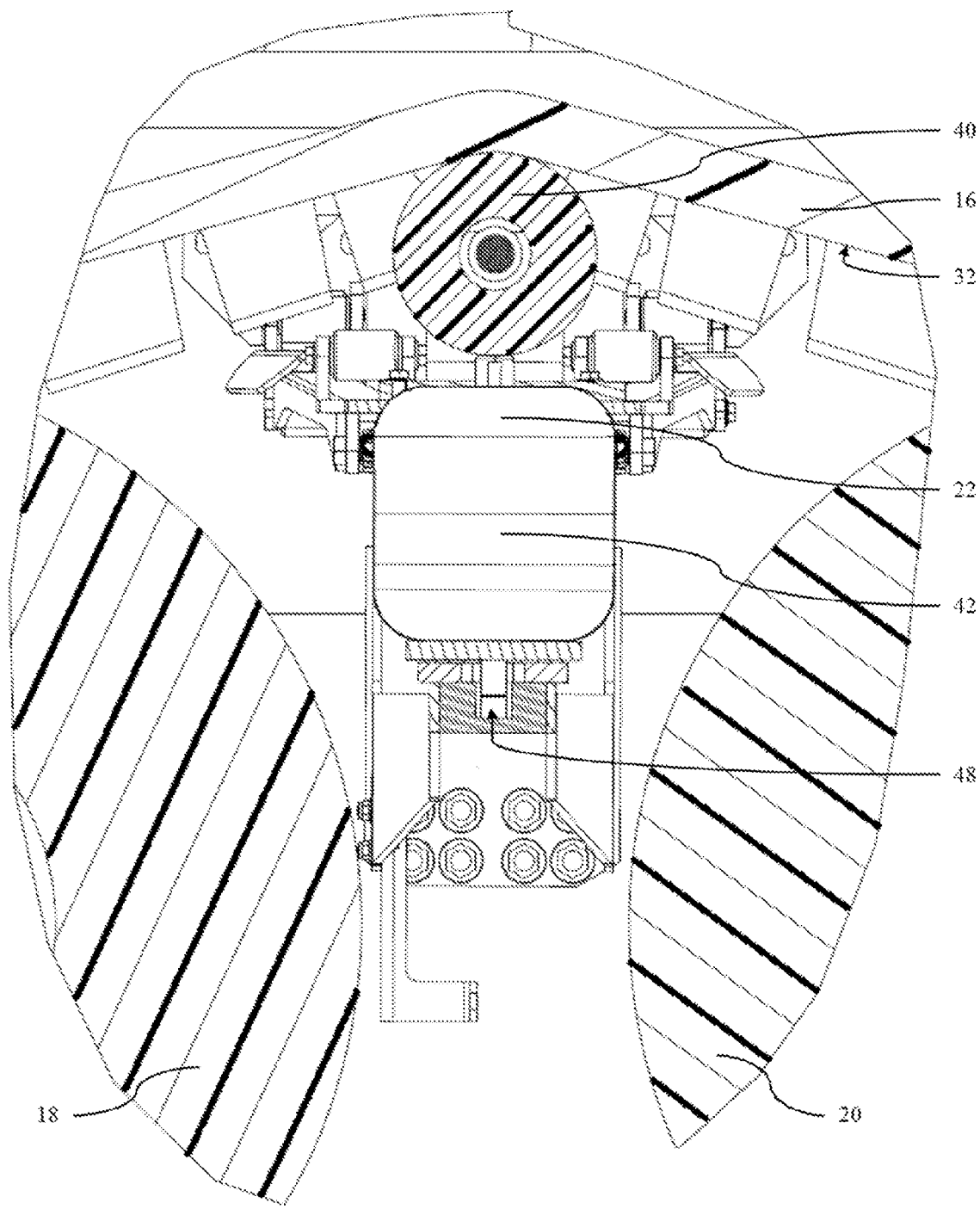
FIG. 4 is a cross-sectional view taken along line 4-4 in FIG. 2 showing an embodiment of a tensioning device.

FIG. 4 is a magnified cross-sectional view taken along line 4-4 in FIG. 2 showing an embodiment of a tensioning device 22 mounted to the vehicle 10. In this embodiment, the cross-sectioning is taken through the tires 18,20 and the endless track 16 to show the idler wheel 40 in contact with the inner surface 32 of the endless track 16.

In the embodiment as seen in FIG. 4, the tensioning device 22 also has a pneumatic port 48 in the bottom of the actuator 42. The pneumatic port 48 is designed to be fluidly connected with a vehicle pneumatic system through a hose (not shown). In one embodiment, the vehicle pneumatic system provides a constant pressure to the actuator 42 through the pneumatic port 48. As slack occurs in the endless track 16, the vehicle pneumatic system pumps in more air to maintain the pressure. As tension builds in the endless track 16, pressure relief valves (not shown) may open to dump off the pressure in the actuator 42. It should be noted that the actuator 42 is a mechanical device that moves the idler wheel 40 back and forth.

The actuator 42 in this invention is not limited to a pneumatic actuator, rather any form of actuator could be used. Actuators 42 may be, but are not limited to, an electric actuator, a hydraulic actuator, a pneumatic actuator, a piezoelectric actuator, or any now known or future design actuating unit. As well, the internal mechanism of the actuator could be a jackscrew, a ball screw, a roller screw, a linear actuator, a rack and pinion, a worm gear, a planetary gear set, a chain drive, a belt drive, a rigid chain, a rigid belt, a cam actuator, hydraulic cylinders, hydraulic pumps, hydraulic pistons, pneumatic cylinders, pneumatic pumps, pneumatic pistons, components employing a piezoelectric effect, an air spring, or any combination of the above.

Figure 5:
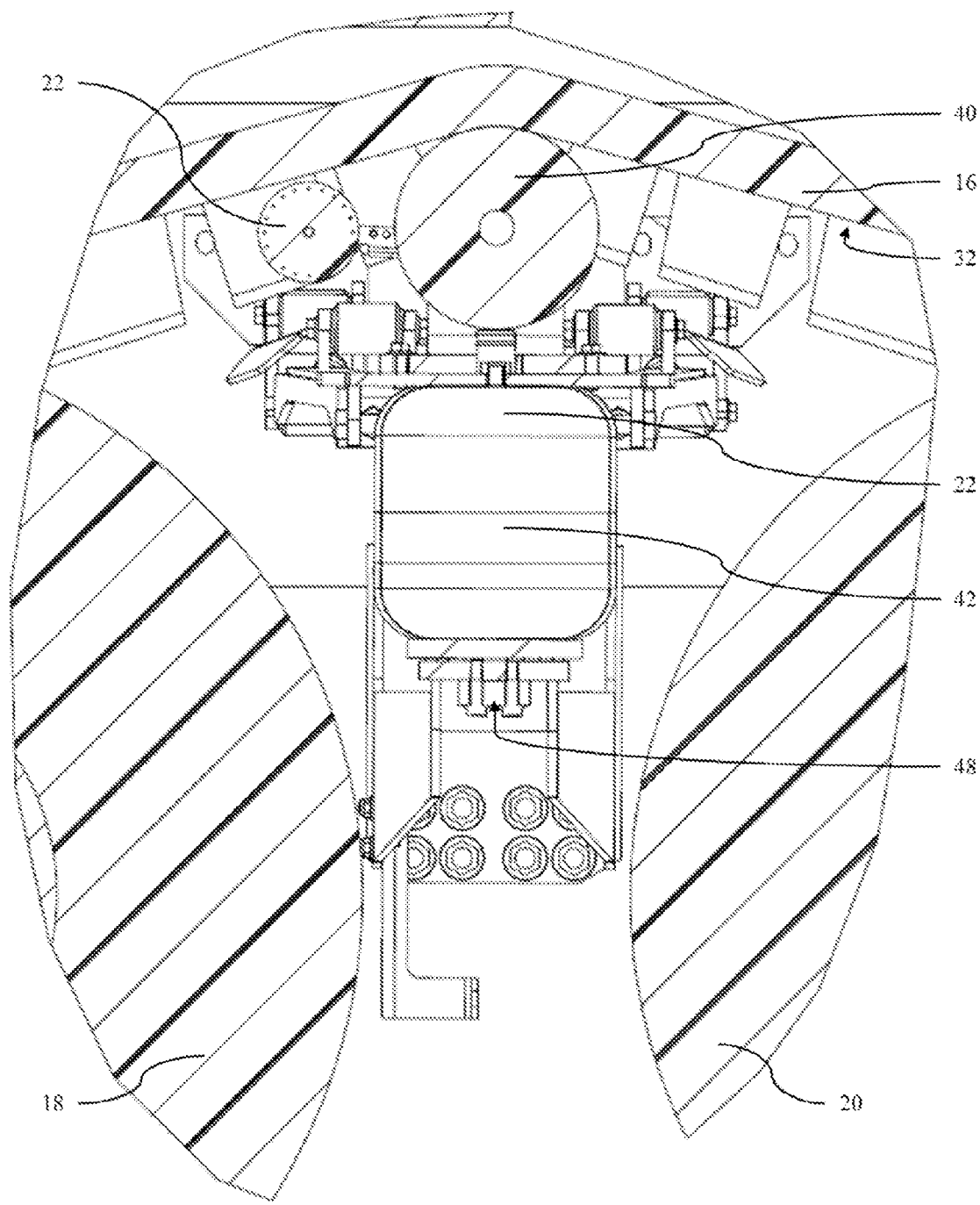
FIG. 5 is a cross-sectional view taken along line 4-4 in FIG. 2 showing an embodiment of a tensioning device with a track speed sensor.

In other embodiments, the track over tire system employs active systems to modify the force applied through the tensioning device 22 to the endless track 16 to maintain an endless track tension within a desired range. FIG. 5 is an embodiment of the track over tire system in which a track speed sensor 60 is used to measure the speed, of the endless track 16, track velocity $V_1$ (see FIG. 8). In this embodiment there is also a means for determining tire velocity $V_2$ (see FIG. 8), such as a wheel speed sensor 62 (represented in block flow diagram). If the track velocity $V_1$ is lower than the tire velocity $V_2$, this indicates that the tires 18,20 are slipping within the endless track 16. When this condition is sensed by comparing the velocities of the endless track 16 and tires 18,20, then the actuator may be employed to apply a greater force on the endless track 16, thus increasing the endless track tension and increasing the friction between the inner surface 32 of the endless track 16 and the tires 18,20. This increased friction, in combination with the greater footprint on the ground created by the endless track 16, will increase the overall traction of the vehicle 10. The algorithm used to control the active system is discussed in further detail below.

Figure 6:
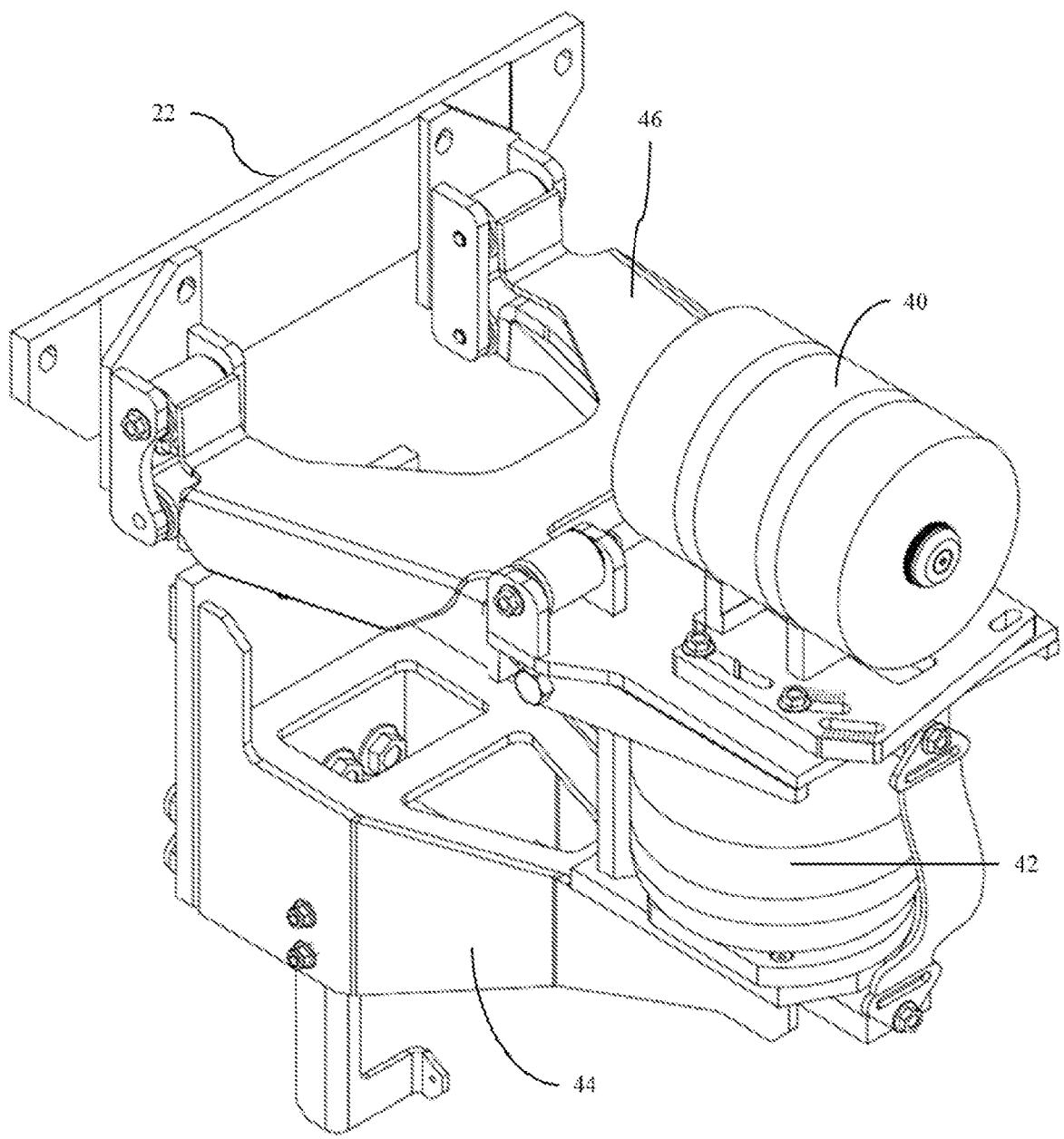
FIG. 6 is a perspective view of an embodiment of a tensioning device.
Figure 7:
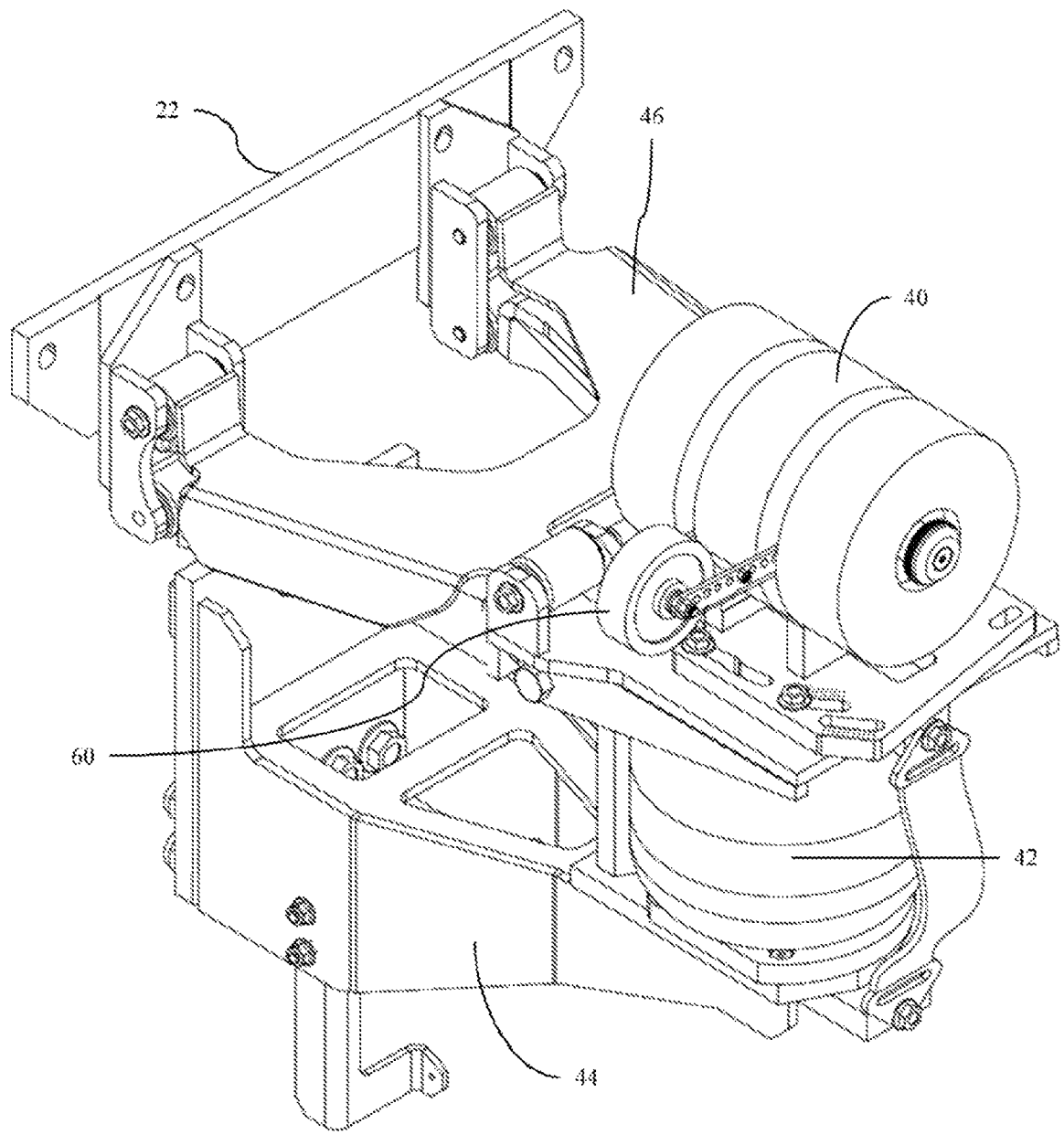
FIG. 7 is a perspective view of an embodiment of a tensioning device with a track speed sensor.

FIGS. 6 and 7 show perspective views of embodiments of tensioning devices 22 with a base 44, an upper articulating arm 46, an actuator 42, and an idler wheel 40. FIG. 7 shows an additional embodiment of the track speed sensor 60.

Figure 8:
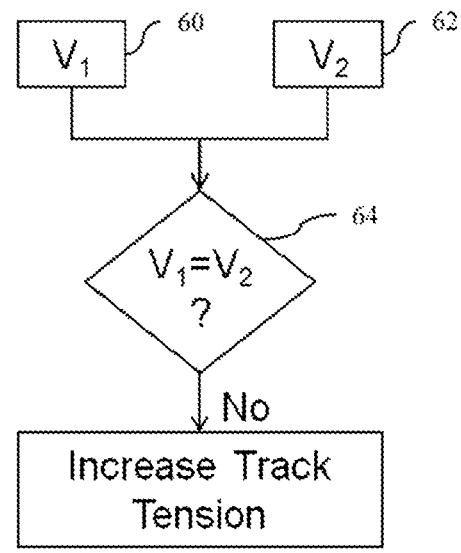
FIG. 8 is a block diagram flowchart illustrating a slip control algorithm using comparative velocities.

In regards to FIG. 8, a block diagram flowchart is shown illustrating a slip control algorithm embodiment using comparative velocities. The flowchart represents when a track speed sensor 60 measures the rotational speed of the endless track 16, track velocity $V_1$, a wheel speed sensor 62 measures the rotational speed of at least one of the tires 18,20, tire velocity $V_2$, and a slip control processor 64 sends a signal to the actuator 42 to increase track tension when the velocities do not match. The slip control processor 64 is electrically connected to the track speed sensor 60, the wheel speed sensor 62, and the actuator 42, such that the slip control processor 64 executes a control loop algorithm to increase force applied to the endless track 16 through the idler wheel 40 when needed.

The slip control algorithm embodiment using a track wheel sensor has the steps of:
1. Receiving a track speed signal $V_1$ from the track speed sensor 60;
2. receiving a wheel speed signal $V_2$ from the wheel speed sensor 62;
3. determining a track slip condition if the track speed signal differs from the wheel speed signal; and
4. sending an actuation signal to the actuator 42 to increase the force applied by the actuator 42 to the endless track 16 if a slip condition is determined.

It should be noted that a track slip condition may also be determined using other sources such as, but not limited to, change in location of the vehicle using a Global Positioning System, GPS (not shown). If the wheel speed sensor 62 tracking vehicle speed does not correlate with the GPS system indicating vehicle speed, then the likely reasoning is that the tires 18,20 are slipping inside the endless track 16. In this condition, the tensioning device 22 may exert a greater force on the endless track 16 creating greater friction between the endless track 16 and the tires 18,20 allowing the vehicle to achieve greater traction forces bringing the tire velocity in alignment with the vehicle velocity.

In yet another embodiment, the slip control processor 64 may be used to monitor when less tension is needed on the endless track 16, such as when the endless track 16 is in a no-slip condition. Reducing tension on the endless track when unneeded will allow for greater suspension 14 movement, allow for lower wear on the endless track 16 and tires 18,20, and reduce fuel consumption when using the track over tire system on the vehicle 10.

The no-slip condition algorithm embodiment using a track wheel sensor has the steps of:
1. Receiving a track speed signal $V_1$ from the track speed sensor 60;
2. receiving a wheel speed signal $V_2$ from the wheel speed sensor 62;
3. determining a track no-slip condition if the track speed signal is substantially equivalent to the wheel speed signal; and
4. sending a reduction signal to the actuator 42 to decrease the force applied by the actuator 42 to the endless track 16 if a no-slip condition is determined.

Figure 9:
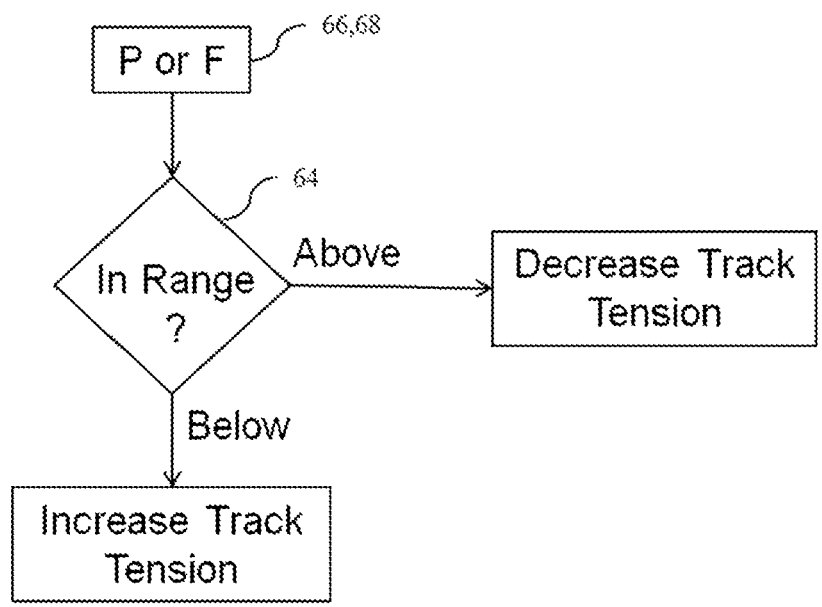
FIG. 9 is a block diagram flowchart illustrating a slip control algorithm using comparative pressure or force.

In regards to FIG. 9, additional embodiments are illustrated via a block diagram flowchart showing a control algorithm using either comparative pressures found within the actuator 42 or comparative forces applied to the endless track 16 by the tensioning device 22.

In the embodiment using comparative forces, a force sensor 66 (represented in block of flow diagram as F) is used in cooperation with the tensioning device 22 to measure the force applied by the tensioning device 22 on the endless track 16. A slip control processor 64 is electrically connected to the force sensor and the tensioning device 22 such that the slip control processor executes a control loop algorithm to increase vehicle traction, the algorithm having the steps of:
1. receiving a tensioning device force signal from the force sensor;
2. comparing the force signal to a predetermined operating force range;
3. determining if the force signal is above or below the predetermined operating force range; and
4. sending an increasing actuation signal to the actuator to increase force applied to the endless track by the actuator if the force signal is below the predetermined operating force range, or sending a reduction signal to the actuator to decrease force applied to the endless track by the actuator if the force signal is above the predetermined operating force range.

In the embodiment using comparative pressures, a pressure sensor 68 (represented in block flow diagram as P) is used in cooperation with the tensioning device 22 to measure pressure in tensioning devices that use an actuator 42. In this embodiment, a pneumatic regulator (not shown) may be fluidly connected between the pneumatic port 48 and the vehicle pneumatic system, such that the pneumatic regulator:
1. receives an actuator pressure reading from the pressure sensor;
2. compares the actuator pressure reading to a predetermined operating pressure range;
3. determines if the actuator pressure reading is above or below the predetermined operating pressure range; and
4. increases pressure inside the actuator through the pneumatic port if the actuator pressure is below the predetermined operating pressure range or decreases pressure inside the actuator if the actuator pressure is above the predetermined operating pressure range.

The figures show a track over tire system disposed around a vehicle 10 with a tandem axle set 12 in which there are only two axles 24, but the track overt tire system is not limited to only two axle designs and may function with vehicles that have multiple axles. In vehicles having multiple axles, the track over tire system cooperates with a front axle having at least one front wheel with a front tire 18, and a rear axle having at least one rear wheel with a rear tire 20. The endless track 16 wraps around the front tire 18 and the rear tire 20. The additional tires associated with the multiple axle set drive over the endless track 16 instead of having direct contact with the ground. The tensioning device 22 in contact with the endless track 16 is attached to the vehicle 10 and disposed between the front tire 18 and the rear tire 20.

The tensioning device 22 may be symmetrically or asymmetrically disposed between the front tire 18 and rear tire 20. In a symmetrically disposed tensioning device 22 there is an equal distance from the front wheel 18 to the tensioning device 22 as from the rear wheel 20 to the tensioning device 22 when the vehicle is on level ground. In an asymmetrically disposed tensioning device 22, the tensioning device 22 is placed closer to one tire than the other. Asymmetric designs work well with three axle vehicles for packaging concerns. As well, multiple tensioning devices 22 may be used with the track over tire system for packaging concerns as well as load sharing.

While embodiments of the invention have been illustrated and described, it is not intended that these embodiments illustrate and describe all possible forms of the invention. Rather, the words used in the specification are words of description rather than limitation, and various changes may be made without departing from the spirit and scope of the invention.

What is claimed is:

1. A track over tire system for a ground based vehicle with a multiple axle set connected to the vehicle through a suspension, the system comprising:

an endless track at least partially disposed around a front tire and a rear tire associated with the multiple axle set, the endless track having a main track body with an inner surface, such that portions of the inner surface contact portions of the front tire and the rear tire, an outer surface opposite the inner surface, such that portions of the outer surface may contact the ground, and a plurality of edge guide projections connected to the main track body and extending away from the inner surface, such that some of the plurality of edge guide projections contact portions of the front tire and portions of the rear tire;

a tensioning device disposed between the front tire and the rear tire, the tensioning device having an actuator disposed between a base and an idler wheel, wherein the base is attached to the vehicle and the idler wheel is in contact with the inner surface of the endless track, such the actuator may actuate away from the base and apply a force to the inner surface of the endless track through the idler wheel, thereby varying endless track tension around the front and rear tires, and reducing slippage between the endless track and the front and rear tires; and wherein the endless track and the tensioning device cooperate to increase vehicle traction and allow for axle suspension movement via the actuator having a pneumatic port in fluid connection with a vehicle pneumatic system, a pressure sensor in cooperation with the tensioning device to measure pressure in the actuator, and a pneumatic regulator fluidly connected between the pneumatic port and the vehicle pneumatic system, such that the pneumatic regulator, in response to receiving an actuator pressure reading from the pressure sensor, compares the actuator pressure reading to a predetermined operating pressure range, and increases pressure inside the actuator through the pneumatic port if the actuator pressure is below the predetermined operating pressure range.

2. The system of claim 1
wherein the pneumatic regulator, in response to receiving an actuator pressure reading from the pressure sensor, compares the actuator pressure reading to a predetermined operating pressure range,
and
decreases pressure inside the actuator if the actuator pressure is above the predetermined operating pressure range.

3. The system of claim 1, wherein the multiple axle set is a tandem axle set.

4. A track over tire system for use on a vehicle with a plurality of axles connected to the vehicle by a suspension, the system comprising:
a front axle having at least one front wheel with a front tire, and a rear axle having at least one rear wheel with a rear tire;
an endless track at least partially disposed around the front tire and the rear tire, such that portions of the endless track contact portions of the front tire and the rear tire; and
a tensioning device in contact with the endless track and attachably disposed to the vehicle between the front tire and the rear tire, the tensioning device having an active actuator used to apply a force to the endless track to maintain a tension range on the endless track while reducing tire slippage and allowing for vehicle suspension movement,
wherein the active actuator has a pneumatic port connected to a vehicle pneumatic system, such that the tensioning device uses compressed air from the vehicle pneumatic system to actuate, a pressure sensor is in cooperation with the tensioning device to measure pressure inside the active actuator, and a pneumatic regulator is fluidly connected between the pneumatic port and the vehicle pneumatic system, such that the pneumatic regulator is in cooperation with the vehicle pneumatic system, and the active actuator varies the force applied by the active actuator on the endless track thereby increasing tire traction or allowing increased vehicle suspension movement, via receiving an actuator pressure reading from the pressure sensor, comparing the actuator pressure reading to a predetermined operating pressure range, and reducing pressure inside the active actuator if the actuator pressure is above the predetermined operating pressure range, and increasing pressure inside the active actuator if the actuator pressure is below the predetermined operating pressure range.

5. The system of claim 4, wherein the active actuator applies a varying force up to 4000 pounds on the endless track.

6. A method of increasing vehicle traction on a vehicle with multiple axles connected to the vehicle through a suspension, in which each axle has at least one wheel with a tire, the method comprising:
providing an endless track to partially surround the tires of the multiple axles resulting in an increased vehicle footprint;
providing a pneumatic actuator for variably exerting a force on the endless track to increase track tension, decrease track slippage relative to the tires, allow for suspension travel, and in combination with the increased vehicle footprint increase overall vehicle traction;
providing a means for determining pneumatic actuator pressure; and
providing a means for modifying the pressure in the pneumatic actuator to be within a predetermined operating range.

7. The method of claim 6 wherein the means for determining pneumatic actuator pressure is provided by a pressure sensor in fluid communication with the pneumatic actuator.

8. The method of claim 7 wherein the means for modifying the pressure in the pneumatic actuator to be within a predetermined operating range is provided by a vehicle pneumatic system in fluid communication with the pneumatic actuator, and the vehicle pneumatic system, in response to the pressure sensor readings, provide pressure to the pneumatic actuator.

9. The method of claim 6 wherein the means for determining pneumatic actuator pressure and for modifying the pressure in the pneumatic actuator to be within a predetermined operating range is provided by a pressure relief valve which opens to relieve pressure within the pneumatic actuator at a predetermined upper pressure level.

10. The method of claim 9 wherein the means for determining pneumatic actuator pressure and for modifying the pressure in the pneumatic actuator to be within a predetermined operating range is provided by a vehicle pneumatic system providing constant pressure to the pneumatic actuator which fills the pneumatic actuator with pressure when the pneumatic actuator falls beneath a predetermined lower pressure level.

11. The method of claim 10 wherein the predetermined lower pressure level is the constant pressure level as provided by the vehicle pneumatic system.

* * * * *